United States Patent [19]

Oriez et al.

[11] Patent Number: 4,954,073
[45] Date of Patent: Sep. 4, 1990

[54] APPARATUS FOR HIGH FREQUENCY MOLDING OF LIQUID PLASTIC MATERIAL

[75] Inventors: Robert Oriez, Vendome; Elie Gras, Genay, both of France

[73] Assignee: Anver, Maisons-Alfort Cedex, France

[21] Appl. No.: 347,306

[22] Filed: May 4, 1989

[30] Foreign Application Priority Data

May 4, 1988 [FR] France ............................... 88 05968

[51] Int. Cl.$^5$ .............................................. B29C 45/22
[52] U.S. Cl. ............................... 425/547; 264/328.16; 425/562; 425/564; 425/812
[58] Field of Search ............... 425/543, 562, 563, 564, 425/565, 566, 542, 812, 547; 264/328.16

[56] References Cited

U.S. PATENT DOCUMENTS 4,498,860 2/1985 Gahan .................................. 426/566
4,800,049 1/1989 Gras ................................... 425/405.1

*Primary Examiner*—Jay H. Woo
*Assistant Examiner*—Timothy W. Heitbrink
*Attorney, Agent, or Firm*—Browdy and Neimark

[57] ABSTRACT

An apparatus for high frequency molding by injecting a liquid plastic material under pressure into a mold, while simultaneously venting the inside cavity of the mold, optionally by applying to suction. In order to overmold and/or mold onto a prisoner a part in the form of a closed loop, a sealing insert (i) is disposed between the openings into the mold for its injection nozzle (17) and its venting nozzle (18). The shape of the insert corresponds to the profile of the mold, and the insert is made of a material having the same nature as the injected plastic material, such that the insert melts and is welded to the molded or overmolded part when the high frequency electric field is applied by means of an appropriate generator. The injection and the venting nozzle are controlled by respective double action actuator devices fitted with pistons and piston rods made of a material which does not exhibit dielectric loss, and forming a removable unit assembly. The invention is applicable to manufacturing shaped parts, in particular for car manufacture.

3 Claims, 2 Drawing Sheets

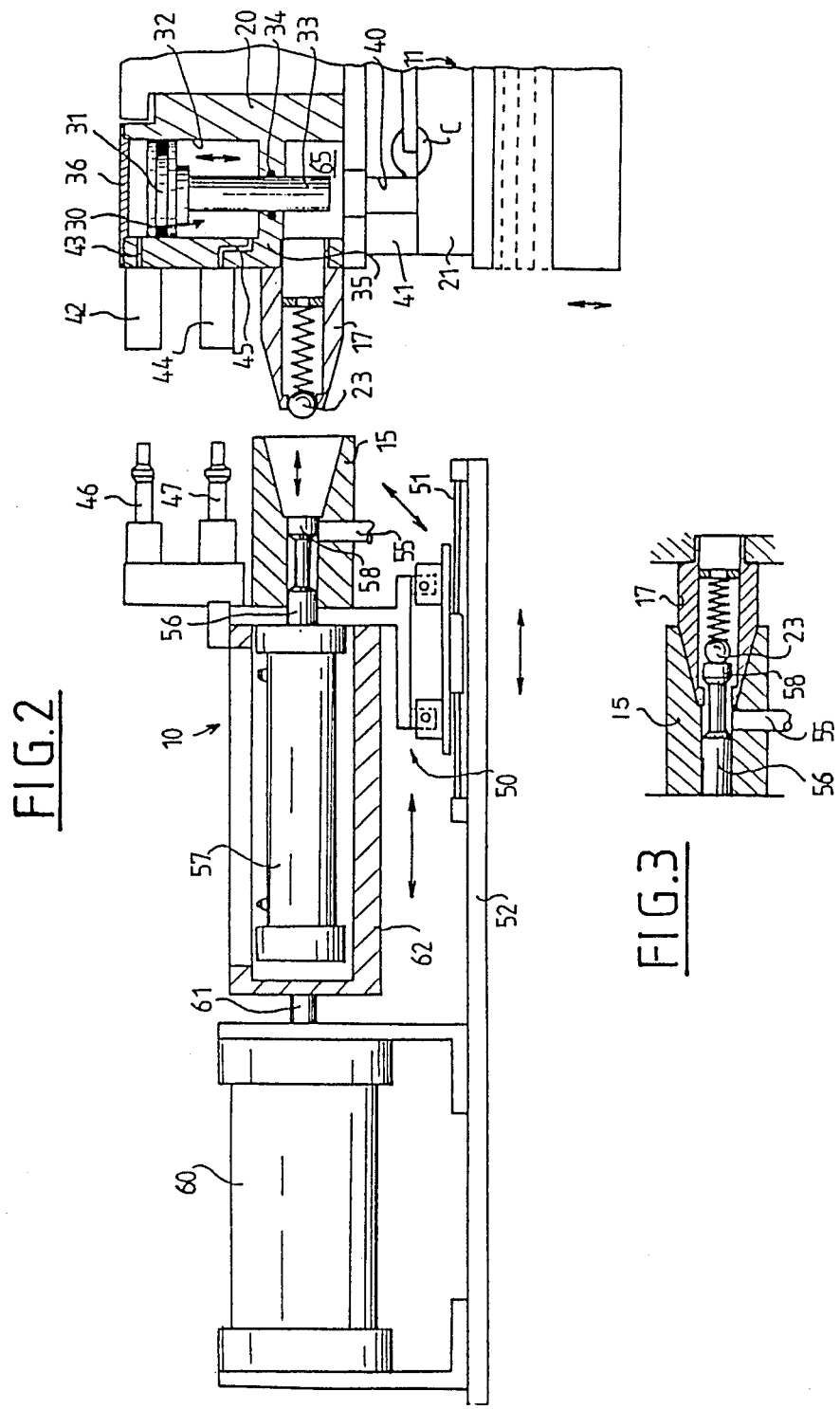

APPARATUS FOR HIGH FREQUENCY MOLDING OF LIQUID PLASTIC MATERIAL

FIELD OF INVENTION

The invention relates to a method and to apparatus for high frequency molding of liquid plastic material.

BACKGROUND OF THE INVENTION

French patent number 2 598 959, in the name of the present Assignee, describes, for example, a method and apparatus for manufacturing plastic molded objects from a liquid plastisol injected into a mold, which mold, after being filled under pressure simultaneously with its inside cavity being subjected to suction, is itself subjected to the action of a high frequency electric field from an appropriate generator. Such a technique is used, for example, in order to fabricate articles of leather goods, or parts for shoes, using a plastisol which is caused to gell by passing the mold between the two plates of the high frequency generator.

Although the method and the apparatus developed by the Assignee provide good results, continuing work has nevertheless shown that they can be further improved, and also that the method can be extended to applications other than molding common objects.

SUMMARY OF THE INVENTION

Consequently, a general object of the invention is to provide improvements to the method and apparatus for high frequency molding of liquid plastic material, thereby considerably increasing the uses to which they can be put.

Another object of the invention is to provide a method and apparatus for high frequency molding of liquid plastic material making it possible, simply and reliably, to obtain parts which are more complex than those generally obtained using known methods, and in particular objects in which two parts are permanently assembled to each other by overmolding one of the parts on the other.

In this respect, an object of the invention is to provide a method and apparatus that can be used for overmolding plastic material onto a wide range of parts, e.g. made of wood, glass, laminated composite material, and, where appropriate, metal.

Finally, an object of the invention is to provide a method and apparatus for making overmolded parts in a wide range of shapes, in particular parts of the type constituting a closed loop.

The present invention provides a method of high frequency molding by injecting a liquid plastic material under pressure into a mold while simultaneously venting the internal cavity of the mold via respective nozzles, wherein, in order to overmold and/or mold a part in the form of a closed loop around a substrate or captured part to be united with the molding, a sealing insert is disposed in the mold between the open into the mold of its injection nozzle and its venting nozzle, the shape of said sealing insert corresponding to the mold profile, said insert being made of a material of the same nature as the injected plastic material such that it melts and is welded to the molded or overmolded part during application of the high frequency electric field by an appropriate generator.

The venting nozzle may optionally be connected to a source of suction.

The method may advantageously be implemented using a plastisol, i.e. a suspension or emulsion of PVC resin, however it is not limited to such a substance, since, on the contrary, the invention is applicable to molding numerous liquid plastic materials, in particular those of the polyurethane or the polyether type.

The invention also provides apparatus for high frequency molding of liquid plastic material, the apparatus comprising an injection nozzle for injecting plastic material under pressure into a mold and a venting nozzle for putting the cavity of said mold into connection with the atmosphere or with a source of suction, and including a double acting actuator device for controlling the opening and closing of said nozzles, wherein said device forms a unit assembly suitable for being removably associated with each mold fitted therewith, and in which the pistons and the associated portions of the actuators are made of a material which does not exhibit dielectric loss.

The actuator device is thus insensitive to the electric field and consequently operates reliably and without risk for the apparatus, in particular while the high frequency electric field is being applied.

BRIEF DESCRIPTION OF THE DRAWINGS

An embodiment of the invention is described by way of example with reference to the accompanying drawings, in which:

FIG. 2 is an elevation view, partially in section, of a portion of the apparatus of the invention in a first operating condition;

FIG. 3 shows a detail of the apparatus in a different operating condition; and

DETAILED DESCRIPTION

Figure 1:
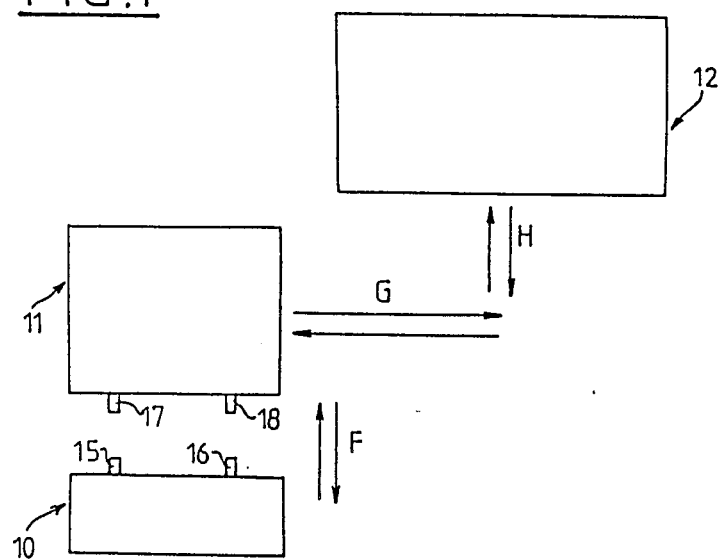
FIG. 1 is a block diagram showing the operating cycle of a high frequency molding apparatus.

Reference is made initially to FIG. 1 which, in highly diagrammatical form, illustrates the operation of an apparatus for high frequency molding of liquid plastic material.

The apparatus is essentially constituted by a first or head portion 10 for feeding a curable liquid plastic material, e.g. a plastisol, and by a mold assembly 11 which, after being filled, is brought level with a high frequency electrical generator 12. The generator is generally stationary whereas the parts 10 and 11 are generally moving parts, with motion of the feed part 10 towards and away from the mold 11 being represented by pair of arrows F, and with motion of the mold assembly 11 towards and away from the generator 12 being as represented by pairs of arrows G and H. More precisely, the feed portion 10 includes an injection nozzle 15 for injecting liquid plastic material and a venting nozzle 16 suitable for connection to the atmosphere or to a source of reduced pressure via a separating tank or vessel. Complementary end pieces 17 and 18 on the mold portion 11 are suitable for co-operating with respective ones of the nozzles 15 and 16 of the feed portion 10 when said moving feed portion 10 is moved close to said mold. After the mold assembly has been filled with liquid plastic material by injection under pressure and by having its internal cavity simultaneously connected to the atmosphere or to suction in order to ensure that it is filled satisfactorily, and in particular in order to eliminate any unwanted bubbles of air or gas, the feed portion 10 is moved away from the mold, and the mold assembly 11 is displaced along arrows G and H to bring it into the electric field generator 12. After the thermoplastic material has polymerized or cured, the mold is withdrawn from the generator, it is opened, and the part formed therein is withdrawn, and once the mold assembly 11 has been returned to its initial position, the apparatus is ready to perform a new cycle.

The sequence of operations described above is controlled in conventional manner by an appropriate automatic control device.

Figure 4:
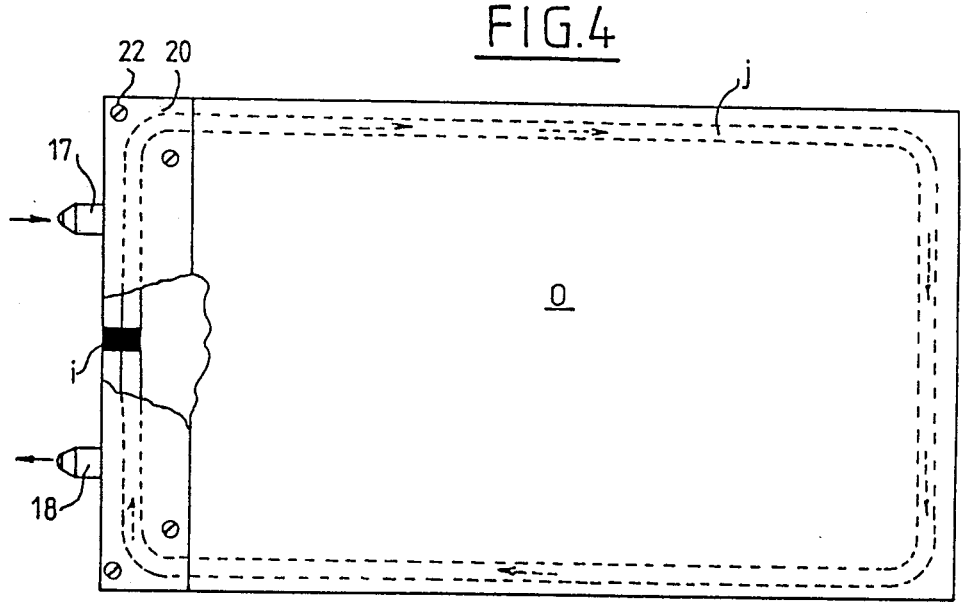
FIG. 4 is a partially cut-away diagrammatic plan view of a portion of the apparatus of the invention as used for overmolding a part having a closed outline.

As shown in FIGS. 2 and 3, in order to increase the usage to which the apparatus may be put, and in particular in order to enable it to operate reliably and without risk the invention provides for the nozzle 17 for injecting liquid plastic material and the nozzle is for connection to a source of reduced pressure to be combined in a unit assembly together with the means for controlling said nozzles, said unit assembly being suitable for being removably associated with each mold fitted therewith. As shown in FIG. 2, the nozzle 17 (and the same applies to the nozzle 18 which is not shown) is constituted by a male nozzle mounted in a block 20 suitable for being removably fixed on the mold 21 per se by means such as bolts 22, shown diagrammatically in FIG. 4.

In order to control opening and closing of the nozzles 17 and 18, e.g. nozzles closed by balls 23, the invention provides for mounting two double acting actuators in the block 20, each being associated with a respective one of the nozzles, and with the actuator associated with the nozzle 17 being shown in FIG. 2 where it is given an overall reference numeral 30. Such an actuator comprises a piston 31 slidably mounted in a cylinder 32 and a piston rod 33 passing in sealed manner by means of an O-ring 34 through an orifice in the end 35 of the cylinder 32, with the opposite end of the cylinder being closed by a plate 36.

In accordance with the invention, the piston 31 and the rod 33 associated therewith are made of a material which does not give rise to dielectric losses, and as a result it is insensitive to high frequency electric fields, with an example of such a material being polytetrafluoroethylene or an analogous material, of the same type as those known by the trademark Teflon (trademark registered by DuPont de Nemours).

In order to control the motion of the piston 31 and its rod 33 whose free end is suitable for disengaging or obstructing a bore 40 of complementary shape in the countermold 41 which together with the mold 21 forms the mold assembly 11, pneumatic means are preferably provided comprising a first pipe 42 opening out (via a duct 43 drilled in the block 20) into a first chamber provided between the cover 36 and the piston 31, while a second pipe 44 opens out (via a hole 45 through the same block 20) into the other chamber of the actuator between the piston 31 and the end 35 of the cylinder 32. Corresponding pipes 46 and 47 are suitable for engaging the pipes 42 and 44, said corresponding pipes being carried by a moving carriage 50 slidably mounted on rails 51 fixed on a base 52 of the apparatus. As can clearly be seen in FIG. 2, the carriage 50 also carries female nozzles or end pieces 15 and 16 for co-operating with the nozzles 17 and 18 respectively, the end piece 15 being connected to a pipe 55 for inserting liquid plastic material, whereas the end piece 16 is connected to a source of suction via a separating tank or vessel (not shown).

In order to open and/or close the pipes for injecting liquid plastic material and/or for communicating with a source of suction, each of the end pieces 15 and 16 is fitted with a valve as shown at 56 for the end piece 15, which valve is simply constituted by a cylinder slidably mounted in the end piece under the control of an actuator 57 having an end head 58 suitable for co-operating with the bore 23, as shown in FIG. 3.

The operation of this apparatus is clear from the above. The liquid plastic material to be injected is maintained permanently under pressure, either by means of a pump or else by means of a header tank. Initially the head portion 10 of the apparatus is moved close to the mold device, e.g. by means of an actuator such as 60 (FIG. 2) mounted on the base 52 and having its rod 61 connected to a block 62 of said head. After the end pieces 15 and 16 have coupled with respective ones of the nozzles 17 and 18, and after the pipes 46 and 47 have likewise coupled with respective ones of the pipes 42 and 44, the pneumatic means corresponding to the end piece 16 and to the nozzle 18 are operated so that the suction source, e.g. a separating tank or vessel, exerts its effect while the double acting actuator associated with the pipe 55 for injecting the plastisol is in its position for preventing injection into the mold 21. After the pressure in the inside cavity C of the mold has been reduced, the double acting actuator for allowing the plastisol to be injected is operated so as to disengage the piston rod 33 from the opening 40 in the countermold 41. The plastisol is injected at ambient temperature by a circuit which comprises, going from the pipe 55: the valve 56, now open (as shown in FIG. 3); the nozzle 17; a chamber 65 provided beneath the end 35 of the block 20, adjacent to the opening 40; said opening; and then the cavity C until it is completely filled, with excess plastic material being recovered, where necessary, in the separating tank or vessel from which said plastic material may subsequently be recycled. Once the mold has been filled, the double acting actuator 31 is actuated to close the orifice 40 in the countermold, thereby simultaneously eliminating the molding sprue, the nozzle 18 having meanwhile been disconnected from the source of suction, the actuator 57 is actuated to close the valves such as 56 in the end pieces 15 and 16; after the actuator 60 has been operated, the feed head 10 is at a distance from the mold 11. The mold can then be displaced, as mentioned above, in the directions of pairs of arrows G and H into the high frequency generator 12 where the injected plastic material is polymerized.

Apparatus of the invention, as described above, is also advantageously applicable to implementing a molding method on a substrate or "captured performed part", or for overmolding on a part having a shape with a closed loop. In order to implement such a method, the invention provides for placing an insert i between the openings into the mold 21 of the injection nozzle 17 and of the suction nozzle 18, said insert i being disposed in the mold 21 (see FIG. 4) and being shaped to match the outline of the mold and being made of a material of the same nature as the injected plastic material. Such an insert which provides sealing between the injection nozzle 17 and the nozzle 18 connected to the suction or separating tank or vessel, enables the mold and the countermold to be filled completely, in particular when the method is implemented for overmolding around the periphery of an object O, e.g. a car window glass which is to have a sealing gasket j overmolded around its edges.

When the high frequency electric field is applied in the generator 12, the insert i is simultaneously melted and welded with the remainder of the plastic material constituting the gasket j, thereby providing a continuous gasket of excellent quality.

The method of the invention, which may be implemented not only with a plastisol, but also with other liquid plastic materials, and in particular materials of the polyurethane type or of the polyethel type, thus makes it possible (providing only that the "captured part" or the part to be overmolded is compatible with a high frequency molding method) to obtain parts whose shapes are highly diverse, particularly when the part to be overmolded is itself made of wood, glass, laminated composite material, or where appropriate, a metal providing the "balancing" conditions of the mold during high frequency treatment are designed appropriately.

The uses to which the invention may be put can be further increased by suitably selecting an adhesion primer which is initially disposed on the captured part or on the part to be overmolded prior to insertion in the mold, thereby improving adhesion of the injected plastic material on said part or said captured part.

What is claimed is:

1. High frequency molding apparatus for producing a molded object having a plastic part shaped as a closed loop around a substrate, said apparatus comprising:

a mold assembly (11) having a first opening and a second opening (40) and defining a mold cavity therewith;

feeding means (10) for filling the cavity of said mold by injecting a heat curable plastic into said first opening and for venting the cavity of said mold through said second opening, said feeding means comprising a female injection nozzle (15) and a female venting nozzle (16);

high frequency curing means (12) for subjecting said filled cavity to high frequency heating and pressure;

a male injection nozzle (17) and a male venting nozzle on said mold assembly respectively adjacent said second and first openings for communicating with said female injection nozzle and said female venting nozzle respectively;

control means (30) for controlling opening and closing of said male nozzles, said control means comprising first and second double action actuators comprising respective piston cylinder ram assemblies respectively associated with said male injection nozzle and said male venting nozzle, and comprising respective pistons and piston rods made of a material which does not exhibit dielectric loss, said actuators being mounted so that said piston rods slide respectively into and out from said first and second openings for respectively closing and opening the communication between said nozzles and said first and second openings, said male nozzles and said actuators forming a unit assembly removably associated with each mold fitted therewith.

2. Apparatus according to claim 1, wherein the pistons (31) and the piston rods of the actuators (33) are made of polytetrafluoroethylene.

3. Apparatus according to claim 1, wherein the said ram assemblies are enclosed in a block (20) which is releasably fastenable to said mold assembly (11).

* * * * *